US008790557B2

(12) United States Patent
Kalwa

(10) Patent No.: US 8,790,557 B2
(45) Date of Patent: Jul. 29, 2014

(54) METHOD AND INSTALLATION FOR PRODUCING A WOOD-FIBER BOARD

(71) Applicant: Flooring Technologies Ltd., Pieta (MT)

(72) Inventor: Norbert Kalwa, Horn-Bad Meinberg (DE)

(73) Assignee: Flooring Technologies Ltd., Pieta (MT)

( * ) Notice: Subject to any disclaimer, the term of this patent is extended or adjusted under 35 U.S.C. 154(b) by 0 days.

(21) Appl. No.: 13/770,323

(22) Filed: Feb. 19, 2013

(65) Prior Publication Data

US 2013/0153153 A1 Jun. 20, 2013

Related U.S. Application Data

(62) Division of application No. 12/713,794, filed on Feb. 26, 2010, now Pat. No. 8,394,302.

(30) Foreign Application Priority Data

Mar. 4, 2009 (EP) .................................... 09003064

(51) Int. Cl.
*B32B 37/24* (2006.01)
*B32B 38/14* (2006.01)

(52) U.S. Cl.
USPC ....... 264/113; 264/132; 264/172.19; 264/309

(58) Field of Classification Search
USPC ............................ 264/132, 113, 172.19, 309
See application file for complete search history.

(56) References Cited

U.S. PATENT DOCUMENTS

| | | | | |
|---|---|---|---|---|
| 6,066,367 | A | 5/2000 | Nishibori | |
| 6,103,160 | A | 8/2000 | Uchida et al. | |
| 6,243,931 | B1 | 6/2001 | Linville et al. | |
| 2003/0001304 | A1 | 1/2003 | Graf | |
| 2007/0266877 | A1 * | 11/2007 | Oldorff | 101/483 |
| 2009/0155612 | A1 * | 6/2009 | Pervan et al. | 428/498 |

FOREIGN PATENT DOCUMENTS

| | | | |
|---|---|---|---|
| DE | 19532819 | A1 | 3/1997 |
| DE | 10115567 | C1 | 8/2002 |
| DE | 10252863 | A1 | 5/2004 |

(Continued)

OTHER PUBLICATIONS

European Search Report for corresponding European Application No. EP 09 00 3064.

*Primary Examiner* — Joseph S Del Sole
*Assistant Examiner* — Lawrence D Hohenbrink, Jr.
(74) *Attorney, Agent, or Firm* — Andrew M. Calderon; Roberts Mlotkowski Safran & Cole, P.C.

(57) ABSTRACT

A method for producing a wood-fiber board, which has a pattern on the top, in that glued wood fibers are scattered at least one layer to form a fiber cake, and the fiber cake is subsequently compressed under pressure and temperature to form a board of the desired thickness, is characterized in that the pattern is applied to the fiber cake before compression. An installation for producing a wood-fiber board with a scattering device, by means of which a fiber cake comprising at least one layer of wood fibers glued with resin is scattered, and a conveyor device, which conveys the fiber cake in a process direction to a pressing device in which the fiber cake is pressed to form a board of the desired thickness, is characterized in that a printing device is arranged above the conveyor device between the scattering device and the pressing device.

13 Claims, 1 Drawing Sheet

(56) References Cited

FOREIGN PATENT DOCUMENTS

| | | | |
|---|---|---|---|
| DE | 102005021903 | A1 | 11/2006 |
| DE | 102005035214 | A1 | 2/2007 |
| DE | 102007012236 | A1 | 9/2008 |
| EP | 1872959 | A1 | 9/2006 |
| EP | 1837189 | A2 | 9/2007 |
| WO | WO-2007009443 | A2 | 1/2007 |
| WO | WO-2009065769 | A2 | 5/2009 |

* cited by examiner

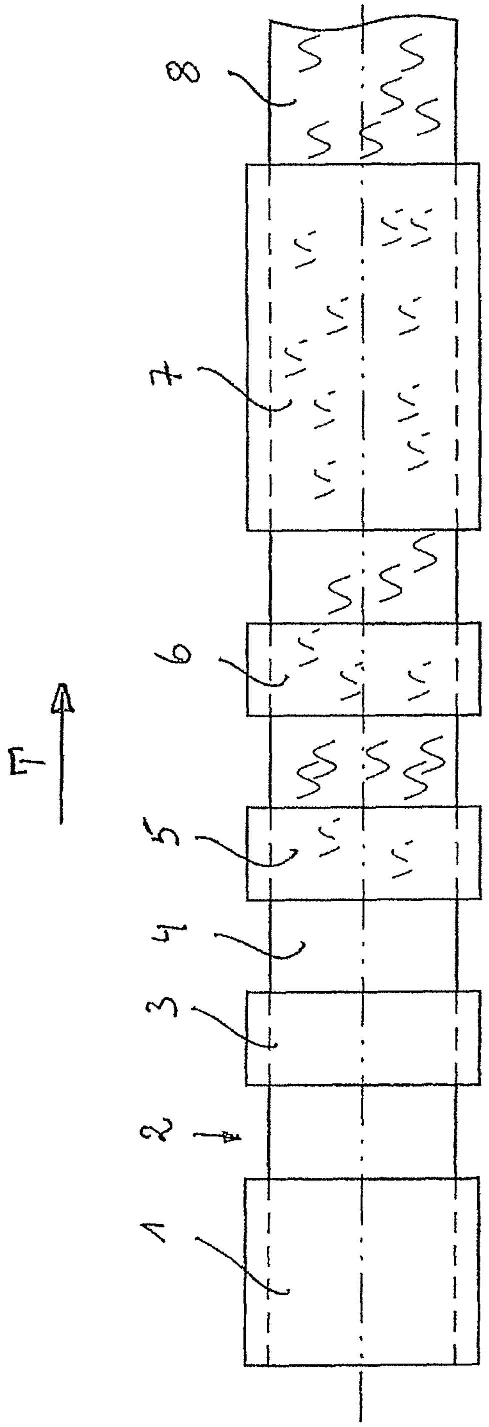
8
7
6
5
4
3
2
1
T

METHOD AND INSTALLATION FOR PRODUCING A WOOD-FIBER BOARD

CROSS-REFERENCE TO RELATED APPLICATIONS

The present application claims priority under 35 U.S.C. §119 of European Patent Application No. 09003064.4, filed on Mar. 4, 2009, the disclosure of which is expressly incorporated by reference herein in its entirety. This application is a divisional application of U.S. application Ser. No. 12/713,794, filed on Feb. 26, 2010, the disclosure of which is expressly incorporated by reference herein in its entirety.

BACKGROUND OF THE INVENTION

1. Field of the Invention

The invention relates to a method for producing a wood-fiber board, which has a pattern on the top, in that glued wood fibers are scattered in at least one layer to form a fiber cake, and the fiber cake is subsequently compressed under pressure and temperature to form a board of the desired thickness. The invention furthermore relates to an installation for producing a wood-fiber board with a scattering device, by which a fiber cake composed of several layers of wood fibers glued with resin is scattered, and a conveyor device, which conveys the fiber cake in a process direction to a pressing device, in which the fiber cake is pressed to form a board of the desired thickness.

2. Discussion of Background Information

DE 10 2005 021 903 A1, DE 10 2005 035 214 A1 or DE 195 32 819 A1 show wood fiber boards. In the wood material industry the focus is on the decorative finishing of the products, for example, wood-fiber boards or products produced therefrom, such as, for example, flooring panels. In addition to improving the optical quality of this decorative finishing, the objective thereby is to simplify production, to reduce the amount of space needed and thus to reduce costs.

Reduction in cost has been achieved, for example, in that the core or the carrier board of wood material of the flooring laminate to be produced is no longer coated with an impregnated and printed decorative paper, as is described, for example, in DE 101 15 567 C1. This has given way to direct printing of the carrier boards with the aid of indirect gravure printing, as is described, for example, in DE 102 52 863 B4 or DE 10 2007 012 236 A1. In addition to saving the additional production step, the precision of the positioning of the imprint on the carrier board was achieved thereby. Moreover, problems were eliminated that were caused by the paper growth during impregnation.

However, direct printing of the wood-fiber board also has some disadvantages. For example, it is necessary during the relatively complex gravure printing method to prime the wood-fiber board before imprinting the actual pattern. Depending on the optical structure of the wood-fiber board used, several priming layers can be necessary. Each layer is applied in a separate printing unit, whereby the production time as well as the space needed for production are markedly increased. Furthermore, in the gravure printing method it is necessary, depending on the desired quality, to use three to four printing units for printing the primed wood-fiber board with the actual pattern. This also increases the retention time of the wood-fiber boards to be printed in the printing line and the space required therefor. Moreover, the production costs of, for example, flooring laminates, are markedly increased by both effects.

SUMMARY OF THE INVENTION

Based on this problem the method for producing a wood-fiber board is to be simplified, wherein the print quality of the pattern is to be increased and the necessary production costs and the space requirement in the production process are to be reduced. To solve the problem noted above, a method is characterized in that the pattern is applied to a fiber cake before compression.

The printing of the in part pre-compressed fiber cake in the production of wood-fiber boards, such as MDF or HDF, in a gravure printing process is difficult to configure. The reason for this is that either a pressure-stable carrier or a substrate, which rests on a stable base is used with this printing method. Advantageously, the printing of the fiber cake is therefore carried out in a contactless manner, in particular in the inkjet method. Suitable inkjet printers are sold, for example, by J. Zimmer Maschinenbau GmbH, Kufstein/Austria. Through this method it is possible to apply the entire printed image onto the fiber cake at one single printing station. Several different printing units, for example, for different colors, are no longer necessary. This leads to considerable savings in terms of space and therefore cost. The use of one or more inkjet printing units is easily possible in a conventional production line for wood-fiber boards, since known inkjet printers reach printing speeds that can be easily adapted to the production speed of the wood-fiber board press.

Since the fiber cake is printed before compression, the print quality and the brilliance of the imprint are considerably increased. The fiber cake has a very large surface as a result of the many fibers lying relatively loosely on one another. This large surface is printed before compression and subsequently compacted during compression. Due to the compression the print point density is increased, through which the brilliance and quality of the print image is increased. The pattern image actually desired is not produced thereby until passage through the press, in which the surface of the fiber cake and thus the applied printed image is compacted. Through the compression of the print image, print points are superimposed or move closer together so that more print points are contained per unit surface area after compression than before compression.

A protective layer can preferably be applied to the fiber cake between the printing of the fiber cake and the compression. This is preferably composed of a cellulose/fiber/resin mixture. This makes it possible to cover the pattern being produced during the compression of the fiber cake with a protective layer at the same time. The pattern is thus protected from the problems of further transport of the wood-fiber board as well as from damage during further processing steps.

The fiber cake to be printed can contain in particular further constituents, such as pigments, resins and/or salts. It is thereby possible, for example, to omit the priming otherwise necessary, which has to be applied to the wood-fiber board before the application of the actual decorative color layers. The printing inks used are thereby preferably adapted to the composition of the fiber cake with its additional constituents.

It has proven to be advantageous that an additional layer of wood fibers, which comprise the additional constituents referenced, is scattered on fibers already scattered. Depending on the function and purpose of the additional constituents, it is often impossible for them to be present in the entire fiber cake. For example, if the additives are intended only to make priming unnecessary, it is sufficient if they are located in the region of the top of the fiber cake to be printed. This is ensured by using a fiber cake without additives, onto which an additional layer of wood fibers containing the additives is scattered, and production costs can be saved.

The wood fibers can thereby be finer in the additional layer than the fibers already scattered. This means that the print quality and the brilliance of the image after compression can be markedly increased once again.

Because the scattered fiber cake is already printed before compression in the method according to the invention, the cycle times are reduced and the space needed is reduced compared to the conventional production method. Furthermore, all material losses, damage and handling problems that can arise due to the conventional transfer of the wood-fiber board to further production steps, no longer occur.

In embodiments, a flooring panel is made from an intermediate product of a core of wood fiber which is composed of non-compressed fiber cake of scatter glued wood fibers in at least one layer having a pattern printed thereon, the non-compressed fiber cake has a thickness that is thicker than the fiber cake after being compressed under pressure and temperature.

BRIEF DESCRIPTION OF THE DRAWINGS

The present invention is further described in the detailed description which follows, in reference to the noted drawing by way of non-limiting examples of exemplary embodiments of the present invention, in which like reference numerals represent similar parts throughout the drawing, and wherein:

The FIGURE shows a board in accordance with the present invention.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

A installation for producing a wood-fiber board is shown diagrammatically in the plan view in the FIGURE and is characterized in that a printing device 5 is arranged above the conveyor device 2 between the scattering device 1 and the pressing device 7.

This makes it possible to print with a decoration a fiber cake 4 scattered on the conveyor device 2, for example, a conveyor belt, before the compression in the pressing device 7. The printing device 5 is thereby advantageously an inkjet printer. It is thus possible to apply the entire print image with only a single printing unit. The use of several different printing units is thus superfluous, which means a marked saving in terms of space and cost is achieved. Of course, however, several inkjet printers can be used in order, for example, to increase the throughput speed.

A first additional application device 6 can be arranged between the printing device 5 and the pressing device 7, in which a board 8 with the desired thickness is produced from the fiber cake 4. A protective layer can be applied to the fiber cake 4 already printed via this first additional application device 6, which protective layer is composed, for example, of a cellulose/fiber/resin mixture. This layer is laid during compression on the pattern produced thereby and thus protects it from damage in the course of further production.

A second additional application device 3 can also be arranged in the process direction "T" before the printing device 5. Using this application device 3 it is possible to apply a further wood-fiber layer on a fiber cake 4 located on the conveyor device 2, which further wood-fiber layer comprises, for example, finer fibers and additives such as pigments, resins or salts, which are required in only this region of the fiber cake 4 because of their function and purpose.

The scattering device 1 can optionally be provided with a device for pre-compacting the fiber cake 4.

A flooring panel according to the invention comprises a core of wood fiber, which is formed by trimming to size and profiling a wood-fiber board that has been produced according to the method according to the invention.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A installation for producing a wood-fiber board, comprising:

a scattering device, by which a fiber cake comprising at least one layer of wood fibers glued with resin is scattered;

a conveyor device, which conveys the fiber cake in a process direction;

a pressing device, in which the fiber cake is pressed to form a board of a desired thickness;

a printing device arranged above the conveyor device between the scattering device and the pressing device; and a first additional application device which is structured to apply a layer to the fiber cake over a print and which is arranged in the process direction between the printing device and the pressing device.

2. The installation according to claim 1, wherein the printing device is at least one inkjet printer.

3. The installation according to claim 1, further comprising a second additional application device, which is arranged in the process direction in front of the printing device.

4. The installation according to claim 3, wherein the second additional application device is structured to apply a further wood-fiber layer on the fiber cake.

5. The installation according to claim 4, wherein the further wood-fiber layer comprises finer fibers and additives including at least one of pigments, resins and salts, which are required in only a region of the fiber cake.

6. The installation according to claim 1, wherein the first additional application device is structured to apply a protective layer to the fiber cake already printed.

7. The installation according to claim 1, wherein the printing device prints the pattern on a pre-compressed fiber cake.

8. The installation according to claim 7, wherein the printing device prints an entire pattern on the pre-compressed fiber cake.

9. The installation according to claim 8, wherein the pressing device compresses the printed image during the pressing of the fiber cake into the board of the desired thickness.

10. The installation according to claim 9, wherein the pressing device compresses the printed image such that print points are superimposed or move closer together so that more print points are contained per unit surface area after compression than before compression.

11. The installation according to claim 1, wherein the scattering device includes a device for pre-compacting the fiber cake.

12. The installation according to claim 11, further comprising a second additional application device, which is arranged in the process direction in front of the printing device, to apply a finer wood-fiber layer and additives on a top of the fiber cake.

13. The installation according to claim 12, wherein a protective layer is laid during compression on the pattern.

* * * * *